(No Model.) 7 Sheets—Sheet 1.
E. CLARENBACH.
DISINFECTING APPARATUS.
No. 400,437. Patented Apr. 2, 1889.
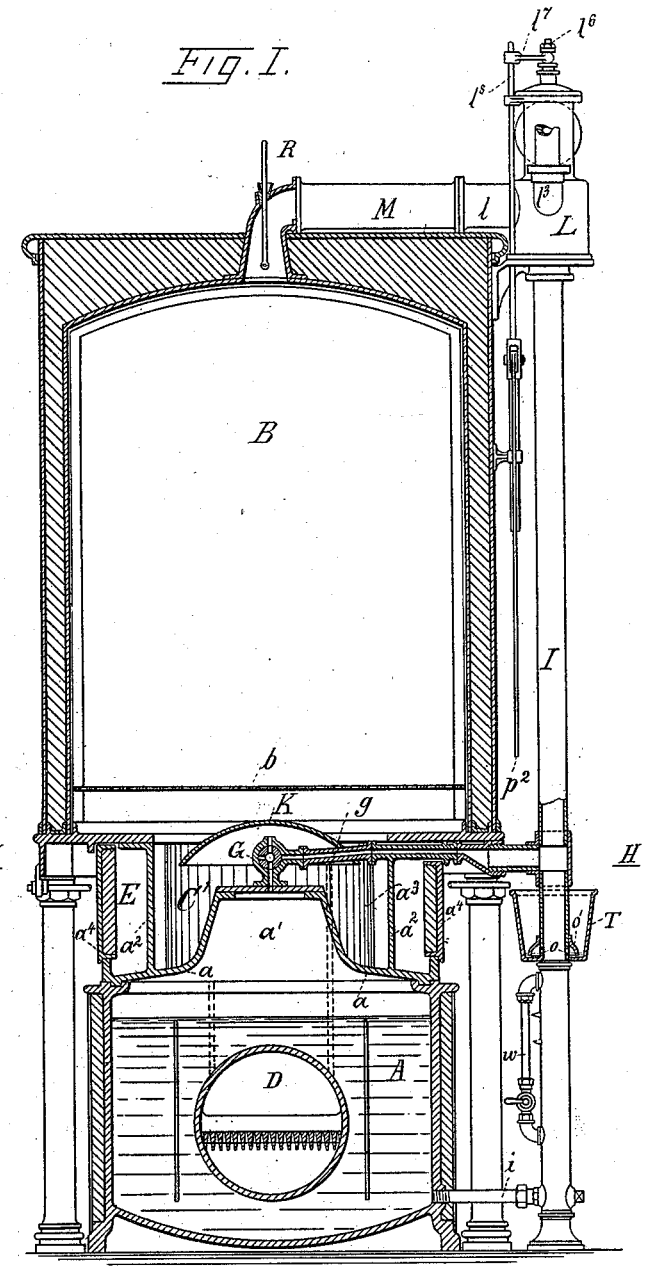
Fig. I.

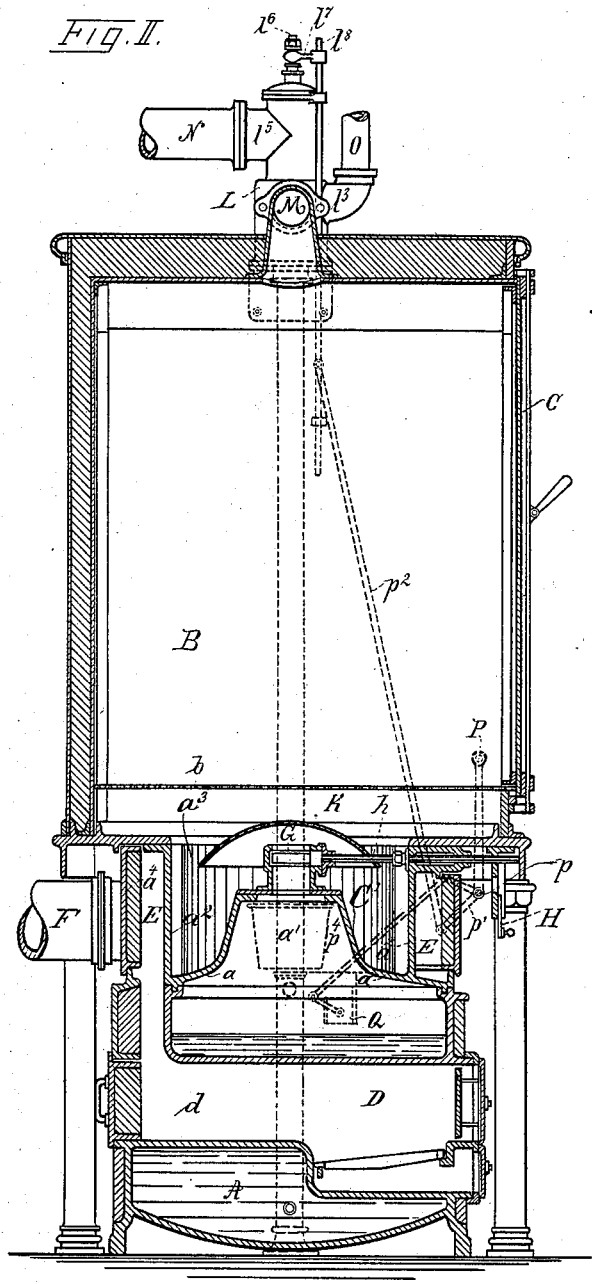

(No Model.) 7 Sheets—Sheet 3.
E. CLARENBACH.
DISINFECTING APPARATUS.
No. 400,437. Patented Apr. 2, 1889.
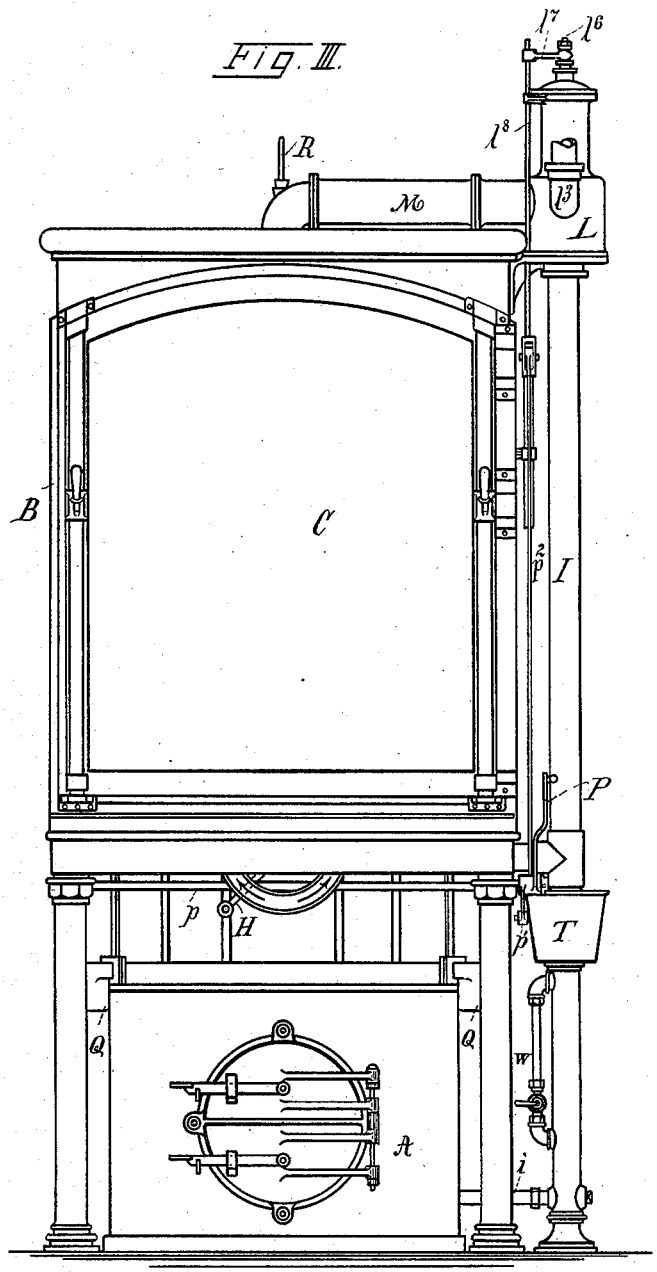

(No Model.) 7 Sheets—Sheet 4.
E. CLARENBACH.
DISINFECTING APPARATUS.
No. 400,437. Patented Apr. 2, 1889.
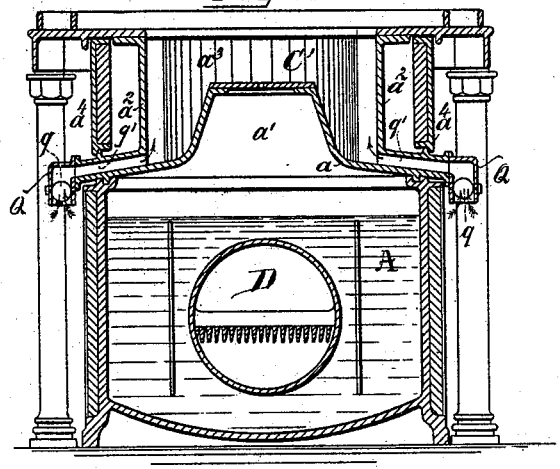
Fig. IV.
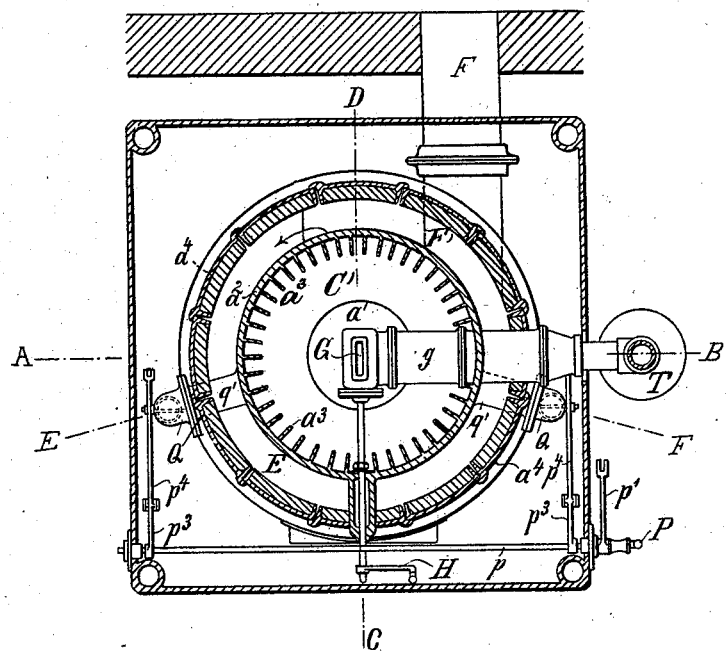
Fig. V.
Witnesses
C. M. Gallaher
A. V. Weaver
Inventor
Eugen Clarenbach (No Model.) 7 Sheets—Sheet 5.
E. CLARENBACH.
DISINFECTING APPARATUS.
No. 400,437. Patented Apr. 2, 1889.
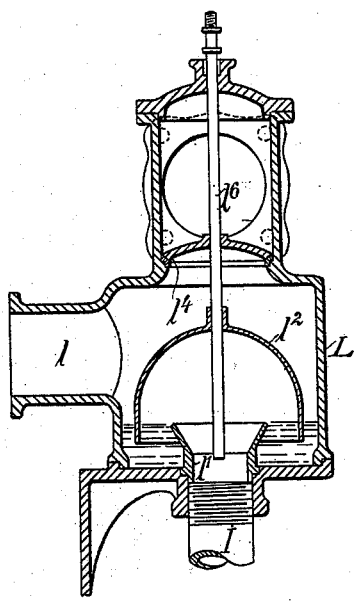
Fig. VI.
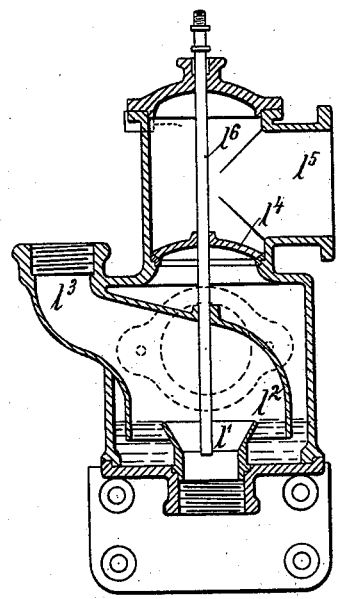
Fig. VII.
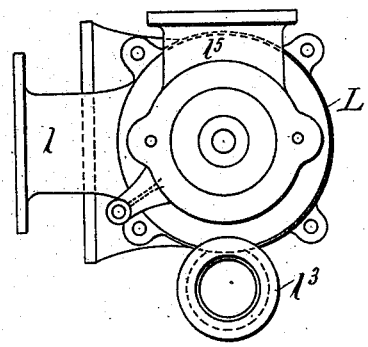
Fig. VIII.
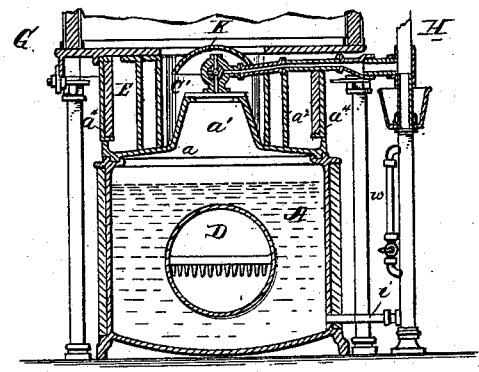
Fig. XIII.

(No Model.) 7 Sheets—Sheet 6.
E. CLARENBACH.
DISINFECTING APPARATUS.
No. 400,437. Patented Apr. 2, 1889.
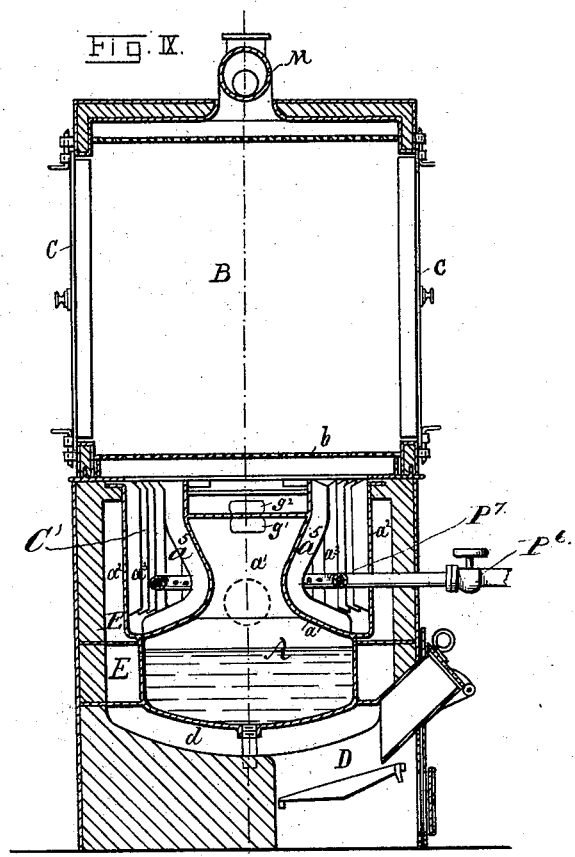
Fig. IX.
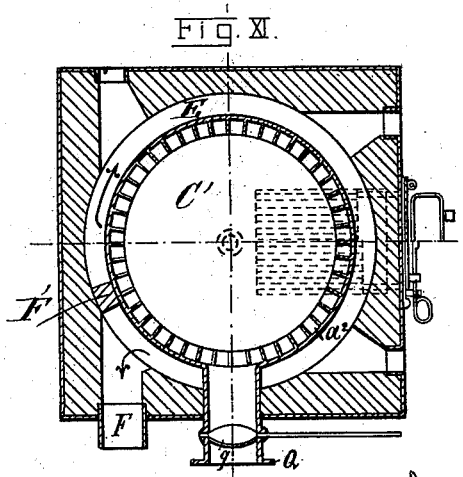
Fig. XI.

(No Model.) 7 Sheets—Sheet 7.
E. CLARENBACH.
DISINFECTING APPARATUS.
No. 400,437. Patented Apr. 2, 1889.
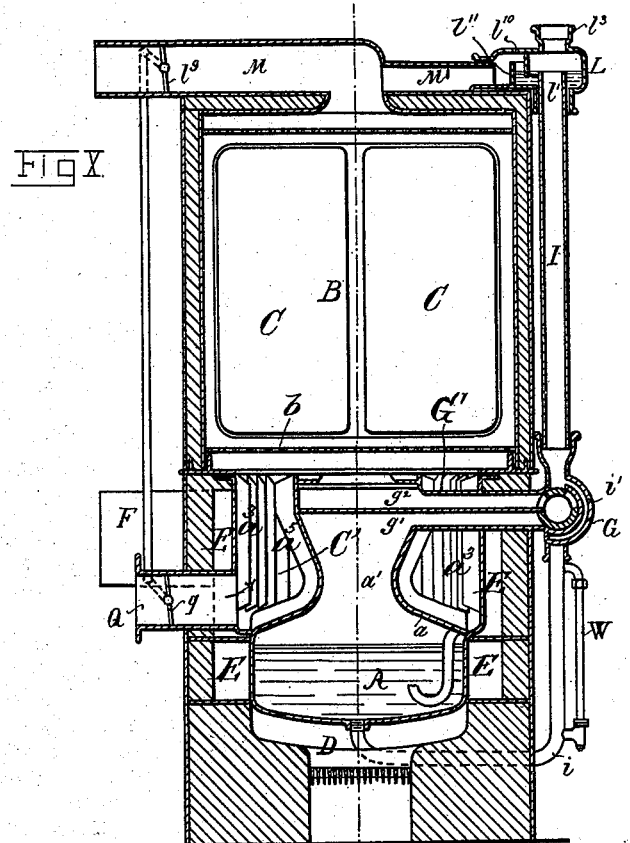
Fig. X.
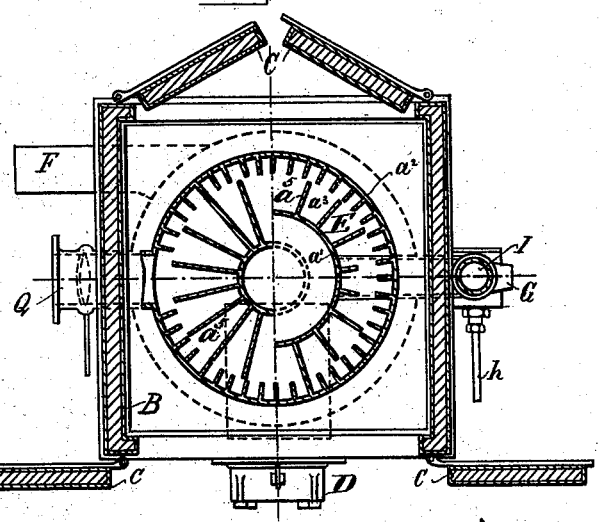
Fig. XI.

UNITED STATES PATENT OFFICE.

EUGEN CLARENBACH, OF BERLIN, GERMANY.

DISINFECTING APPARATUS.

SPECIFICATION forming part of Letters Patent No. 400,437, dated April 2, 1889.

Application filed March 10, 1888. Serial No. 266,872. (No model.) Patented in Norway February 13, 1888, No. 920; in Italy March 1, 1888, XXI, 22,889, and in Austria-Hungary June 1, 1888, No. 49,435 and No. 10,233.

*To all whom it may concern:*

Be it known that I, EUGEN CLARENBACH, engineer, a subject of the King of Prussia, residing at Berlin, 18 Wilhelmstrasse, Prussia, German Empire, have invented certain new and useful Improvements in Disinfecting Apparatus, (for which I have obtained Letters Patent in the following countries: in Italy, dated March 1, 1888, No. 22,889, Vol. XXI; in Austria-Hungary, dated June 1, 1888, No. 49,435 and No. 10,233, and in Norway, dated February 13, 1888, No. 920;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figures 1 and 2 are vertical sections of the apparatus taken, respectively, on the plane of lines A B and C D of Fig. 5. Fig. 3 is a front elevation of the same. Figs. 4 and 5 are horizontal sections taken, respectively, on lines E F and G H of Figs. 5 and 1. Figs. 6 and 7 are vertical sections, taken on lines at right angles to each other, of the valve-casing. Fig. 8 is a top plan view of the same. Figs. 9 and 10 are vertical sections taken on lines at right angles to each other; and Figs. 11 and 12 are horizontal sections of the lower portion of the apparatus shown in Figs. 9 and 10, respectively, illustrating structural modifications of the apparatus. Fig. 13 is a detail view illustrating means for using live steam in lieu of low-pressure steam, or in combination therewith, for disinfecting purposes.

This invention relates to apparatus for sterilizing disease-germs in, or disinfecting wearing-apparel, bedding, and other articles, by means of steam under low pressure; and it consists in the combination, with the disinfecting-chamber, of a steam-generator, and means whereby the steam generated may be passed through the disinfecting-chambers or cut off therefrom, and of means whereby the steam may be held in the disinfecting-chamber or admitted thereto under a certain pressure, substantially as hereinafter described, and set forth in the claims.

The invention further consists in the combination, with the steam-generator and disinfecting-chamber, of means for drying the steam admitted to said chamber, substantially as hereinafter described, and specified in the claims.

The invention further consists in the combination, with the disinfecting-chamber, the steam-generator, and valves for shutting off the steam from said chamber, of an air-heating chamber, and valved air-ducts for admitting air to and heating said air in said heating-chamber previous to the admission of such air into the disinfecting-chamber for the purpose of drying the disinfected articles therein, substantially as described hereinafter, and set forth in the claims.

The invention further consists in the combination, with the disinfecting-chamber and the steam-generator, of steam-distributing devices for distributing the steam uniformly throughout the disinfecting-chamber, and of a deflector and a heater for deflecting the steam against the heater for the purpose of more or less drying such steam previous to the admission thereof into the disinfecting-chamber, substantially as hereinafter described, and pointed out in the claims.

The invention further consists in means of special construction for feeding the steam-generator and for returning the products of condensation thereto, substantially as hereinafter fully described, and set forth in the claims.

Finally, the invention consists in certain details of construction and combinations of parts, substantially as hereinafter described, and set forth in the claims.

In the apparatus of the class described as heretofore constructed the disinfection by means of steam of low pressure has been effected by steam generated in an apparatus entirely separated and distinct from the disinfecting apparatus, and if hot air has been used for subsequently drying the disinfected or sterilized articles the air was also heated in a separate apparatus.

I am aware that steam-generators have been combined with the disinfecting-chamber; but so far as I know the generator consisted of an open boiler, the steam generated passing directly from such open boiler into the disinfecting-chamber.

The object of this invention is to provide a complete disinfecting apparatus in which all the necessary means for generating steam under more or less pressure, drying such steam more or less prior to its admission to the disinfecting-chamber, and for preheating air for the purpose of drying the disinfected articles, are combined in one and the same apparatus in a compact form. The apparatus is composed of two essential parts—namely, a disinfecting-chamber, B, and a steam-generator and air-heater, above which the disinfecting-chamber is preferably arranged.

Referring more particularly to Figs. 1 to 8, inclusive, A indicates the steam generator or boiler, within which is arranged the combustion-chamber D and the flue $d$, for the products of combustion, which leads into an annular flue, E, that is connected with a chimney through pipe F. In this annular flue is arranged a baffle-plate, F', Fig. 5, that is interposed between the connections of the flue with the furnace and chimney, so that the heat and products of combustion will have to travel all around the flue before they reach the pipe F, for obvious purposes.

From the upper wall, $a$, of the generator or boiler rises the conical steam-dome $a'$, encompassed by a vertical annular wall or partition, $a^2$, from whose inner face radiate heat-radiating ribs $a^3$. The annular wall or partition $a^2$ forms, with a like outer wall, $a^4$, the annular flue E, above referred to, that is connected by pipe F with the chimney, and said wall forms, with the projecting conical dome $a'$ of the boiler, a heating-chamber, C'. It will be observed that, irrespective of the special use made of said chamber C', and hereinafter to be described, the described arrangement of the flue E serves the additional purpose of economizing fuel by utilizing the waste heat for heating the boiler. On the dome $a'$ of the boiler A is arranged a three-way cock, G, which, when in the position shown in Figs. 1 and 2, allows the steam in the boiler to pass out. Above said three-way cock is arranged a hood, K, dome-shaped, against which the outflowing steam impinges, and whereby said steam is deflected downwardly against the ribbed radiating-wall $a^2$ of the flue E, so that the steam coming from the boiler will be more or less dried and superheated before entering the disinfecting-chamber B. The latter chamber is arranged above the boiler and separated therefrom by a perforated plate, $b$, that serves to distribute the steam uniformly as it rises from the annular heating-space above described. The disinfecting-chamber has double walls packed with any suitable non-conductor of heat, in one or more of which walls is formed an opening adapted to be hermetically closed by suitable doors, C, for the introduction into and withdrawal from the disinfecting-chamber of the articles to be disinfected or sterilized.

The three-way cock G above referred to is operated by means of a rock-shaft, $h$, connected therewith, and a crank, H.

To the casing of the three-way cock is connected a nearly-horizontal pipe, $g$, that is connected with a vertical exhaust-pipe, I, as shown in Fig. 1. The pipe I at its upper end is connected with a valve-casing, L, that has a lateral branch, $l$, to which a pipe, M, is connected, which pipe M is connected with the disinfecting-chamber at the upper end thereof.

As shown in Figs. 6 and 7, $l'$ indicates a short funnel-shaped pipe, forming substantially a continuation of the pipe I, said pipe $l'$ opening into a bell-mouthed pipe, $l^2$, that encompasses the flaring mouth or end of pipe $l'$ and is connected to an exhaust-pipe, O, at $l^3$, as shown in Fig. 2.

In the upper portion of the casing L is arranged a valve, $l^4$, and said casing has another lateral branch, $l^5$, connected to a ventilating-pipe, N, leading to a chimney. The valve-spindle $l^6$ of the valve $l^4$ is connected, as shown in Figs. 1, 2, and 3, by an arm, $l^7$, with an operating-rod, $l^8$, and the latter is connected, through the medium of a connecting-rod, $p^2$, to a radial arm, $p'$, on a rock-shaft, $p$, that carries the operating-crank P. The shaft $p$ carries two more radial arms, $p^3$, connected to the operating-rod $p^4$ of a valve or damper, $q$, in an air-duct, $q'$, there being one such duct on each side of the apparatus that lead into the heating-chamber C' formed around the boiler-dome $a'$, as shown in Fig. 5. The radial arms P³ and P⁴ on shaft P are so arranged that a partial revolution of said shaft will open the valves or dampers $q$ to admit air to the heating-chamber C' and simultaneously open the valve $l^4$ in casing L, while a like revolution of the shaft in a reverse direction will close the dampers $q$ and valve $l^4$, the shaft $h$ being operated to set the stop-cock G to cut off the steam from the disinfecting-chamber and exhaust it through pipes I, $l'$, $l^2$, and O.

The exhaust-pipe I is provided with a feed-funnel, T, at a point below its connection with the boiler through pipe $g$ and three-way-cock G, and said pipe is extended downward and connects with the boiler near the bottom of the latter.

Surrounding the pipe within the feed-funnel is arranged an inverted hood or bell, $o'$, and at a point above the lower edge of said bell the pipe I has inlet-ports $o$. The object of this arrangement is to form a suitable liquid seal to prevent steam passing from the boiler to the pipe I through pipe $g$ from escaping through the ports $o$, thereby dispensing with a stop-cock, though such may be employed if desired.

W is a level-indicator on pipe I below the feed-funnel for obvious purposes.

The operation of the apparatus is as follows: The articles to be disinfected or sterilized are introduced into the disinfecting-chamber and the three-way cock G set, as shown in Figs. 1 and 2, to admit steam under the deflector K. The steam is deflected downward and outwardly and comes in contact with the hot outer surface of the upper portion of the boiler and with the heat-radiating annular wall $a^2$, and is more or less dried, and then flows upward through the perforated plate $b$ into the disinfecting-chamber, and thence through pipe M into valve-casing L. The steam coming in contact with the cooler surfaces of the casing condenses the water collecting around the bell-mouthed pipe $l'$, soon forms a luting for the bell-mouthed pipe $l^2$, and prevents said steam from escaping until it has attained a sufficient pressure to overcome the resistance offered by the water to its outward flow. The steam is thus maintained in the disinfecting-chamber at a pressure corresponding to the resistance offered by the luting, and this resistance may be regulated by adjusting the pipe $l'$ so as to project more or less above the lower edge of the bell-mouth of pipe $l^2$ to increase the volume of water around said pipe. Any excess of water flows over the mouth of pipe $l'$ and down pipe I to the boiler, so that approximately all the water of condensation is utilized to feed the boiler.

During the above-described operation the valve $l^4$ in casing L and the dampers $q$ in the air-ducts Q are closed, and when the disinfection of the articles is effected the shaft $h$ is manipulated to set the stop-cock G, so as to shut off the steam from the disinfecting-chamber and connect the boiler with the exhaust-pipe. The shaft $p$ is next manipulated to simultaneously open the dampers $q$ in air-ducts Q and the valve $l^4$ in valve-casing L, to admit air to the heating-chamber C', where such air is heated, and flows thence to the disinfecting-chamber, for the purpose of drying the articles therein, and is drawn out of the chamber into the chimney through branch $l^5$ and pipe N. The steam from the boiler at the same time flows through pipe $g$ to pipe I, and thence through casing L and exhaust-pipe $l^2$ and O.

The draft of the chimney assists the inflow of air through ducts Q, and said air in its passage through the disinfecting-chamber and thence to the chimney takes up any steam that may remain in said disinfecting-chamber, the passage of the air to the chimney being unobstructed when the valve $l^4$ is opened, the passage of the steam from pipe I to pipe $l^3$ and O being also unobstructed, as will be readily understood.

In the modified construction of the apparatus (shown in Figs. 9 to 12, inclusive) the three-way cock G, instead of being located above the boiler-dome $a'$, is located within the pipe I, which is enlarged at that point for this purpose, the enlarged portion being of such an extent as to leave a space, $i'$, between the casing of the three-way cock and the pipe to allow the water of condensation to flow around the casing or barrel of the cock to the boiler, as more plainly shown in Fig. 10.

Instead of the pipe $g$, for connecting the boiler with the pipe, a pipe or duct, G', is here used that has two passages, $g'$ $g^2$, the passage $g'$ leading from the boiler to the barrel or casing of the three-way cock, and the passage $g^2$ leading from said barrel or casing to the chamber below the perforated plate $b$.

The boiler-dome in this construction is also provided with heat-radiating ribs $a^5$, as shown in Figs. 9 and 10. In other respects the construction varies but little from that of the apparatus previously described, except in the following particulars: The boiler is heated from a furnace located below said boiler. The valve $l^4$ is replaced by a damper or throttle-valve, $l^9$, that is arranged in the pipe N, leading to the chimney, said pipe being connected with the disinfecting-chamber, and connects said chamber by pipe M with the casing L, the valve $l^4$ of which is dispensed with. Instead of the arrangement of pipe $l'$ and bell-mouthed pipe $l^2$, described in reference to Figs. 1 to 9, the pipe I is made to project into the casing L, and said casing has two partitions, $l^{10}$ $l^{11}$, extending in reverse directions, in proximity to the shell or walls of the casing, to maintain the water of condensation around the upper end of pipe I at a certain level to form a liquid seal for the pipe M, for the purposes heretofore explained, and as shown in Fig. 10. If it is desired to use high-pressure steam for disinfecting purposes, the generator for such steam may be connected directly with the boiler A by pipe $P^6$, Fig. 1, or indirectly by constructing the inner wall, $a^4$, of duct E and outer wall of chamber C' in the form of a double wall, and connecting the space formed thereby with the generator or boiler A, as shown in Fig. 13, a perforated coiled pipe being preferably used to admit the high-pressure steam in fine jets into the boiler A, as shown at $P^7$, Fig. 9; or such coiled pipe may be arranged around the dome $a'$ of the boiler in the chamber C', if desired. In this manner the heat of both the high and low pressure boilers is utilized to dry the steam or heat the air, as the case may be.

I claim—

1. In a disinfecting apparatus, the combination, with the disinfecting-chamber, of a steam-generator, a valved duct for conducting the steam from the generator to said chamber, a heater interposed in the passage of the steam, and a deflector for deflecting such steam upon the heated walls of the heater, substantially as and for the purposes specified.

2. In a disinfecting apparatus, the combination, with the disinfecting-chamber, of a steam-generator, a valved duct for admitting steam to said chamber, a heater interposed in the passage of the steam from the boiler to the disinfecting-chamber, and a valved air-duct connected with the heater and opening into the atmosphere, whereby steam or air, or both, may be admitted to the disinfecting-chamber and said air heated before its admission thereto, substantially as and for the purposes specified.

3. In a disinfecting apparatus, a disinfecting-chamber and a steam-generator connected with said chamber at one end thereof, and in combination therewith, of an exhaust-pipe connected with the generator and by a branch pipe with the opposite end of the disinfecting-chamber to that where it is connected with said generator, and a liquid seal interposed in the connection between the exhaust-pipe and the branch thereof, substantially as and for the purposes specified.

4. In a disinfecting apparatus, the combination, with the disinfecting-chamber, a steam-generator, and a valved duct connecting the generator with said chamber, of a valved air-duct connected with the heater, an exhaust-pipe connected with the generator, and a three-way cock interposed in the connection between the generator, the disinfecting-chamber, and the exhaust-pipe, whereby steam may be admitted to said chamber from the generator or exhausted from the latter by the manipulation of a single cock, substantially as and for the purposes specified.

5. In a disinfecting apparatus, the combination, with the disinfecting-chamber, a valve-casing, L, a pipe connecting the disinfecting-chamber with the valve-casing, an exhaust branch for said valve-casing, a deflector extending to near the bottom of the valve-casing to divide the same into two communicating chambers connected, respectively, with the exhaust branch thereof and the exhaust-pipe of the disinfecting-chamber, and a pipe projecting through the bottom of the valve-casing beyond the lower edge of the deflector, of a steam-generator, a valved duct connecting the generator with the disinfecting-chamber, and a return-pipe connected with the pipe projecting through the bottom of the valve-casing and with the steam-generator, substantially as and for the purposes specified.

6. In a disinfecting apparatus, the combination, with the disinfecting-chamber, a steam-generator, an exhaust-pipe, ducts connecting the generator with the disinfecting-chamber and exhaust-pipe, a three-way cock interposed in said ducts, and valved air-ducts communicating with the disinfecting-chamber, of a rock-shaft, an operating-lever secured thereto and connected with the three-way cock, and a like shaft and valve connected with the air-duct valves, said parts being arranged and operating substantially as shown and described.

7. In a disinfecting apparatus, the combination, with the disinfecting-chamber, of a steam-generator arranged below the chamber and provided with a steam-dome, a draft-flue connected with the generator-furnace encompassing the steam-dome to form between the two a heating-chamber, said chamber communicating with the disinfecting-chamber, a connection between the draft-flue and a chimney, and a partition, F', in said flue interposed between the inlet and outlet for the products of combustion, substantially as and for the purposes specified.

8. In a disinfecting apparatus, the combination, with the disinfecting-chamber, of a steam-generator arranged below the chamber and provided with a steam-dome, a draft-flue provided on its inner wall with heat-radiating ribs, said flue encompassing the steam-dome and forming a heating-chamber around the same—that is, in communication with the disinfecting-chamber—a furnace, a connection between the furnace and the draft-flue and between the latter and a chimney, and a partition, F', interposed in said draft-flue between the inlet and outlet for the products of combustion, substantially as and for the purposes specified.

9. The combination, with the disinfecting-chamber, of a steam-generator provided with a steam-dome having radiating-ribs on its outer surface, and a draft-flue encompassing the steam-dome having radiating-ribs formed on its inner surface, substantially as and for the purposes specified.

10. In a disinfecting apparatus, the combination, with the disinfecting-chamber, a steam-generator arranged below the same and provided with a steam-dome, a valved steam-duct extending vertically from the dome, and a hood or deflector arranged above the steam-duct, of a flue connected with the generator-furnace and with a chimney surrounding the steam-dome and forming a heating-chamber in communication with the disinfecting-chamber, substantially as and for the purposes specified.

11. In a disinfecting apparatus, the combination, with the steam-generator, an exhaust-pipe connected with both the steam and water spaces of the boiler, said pipe having feed-ports formed therein at a point intermediate of its connections, of a feed-hopper surrounding said ports, and a bell or hollow cone mounted on the pipe, with its open end below the feed-ports, substantially as and for the purposes specified.

12. In a disinfecting apparatus, the combination, with the disinfecting-chamber having a perforated bottom, of a steam-generator arranged below said chamber and provided with a steam-dome, a valved steam-duct extending vertically from the dome, a hood or deflector arranged over said duct, a flue surrounding the steam-dome and deflector connected with the generator-furnace, and a chimney and cold-air ducts connected with the space between the dome and surrounding flue, substantially as and for the purposes specified.

13. The combination, substantially as described, with the disinfecting-chamber, a steam-generator, a valved steam-duct in communication with the disinfecting-chamber, an exhaust-pipe, and a valved connection between the exhaust-pipe and steam-space of the boiler, of a valve-casing on the exhaust-pipe, into which said pipe projects slightly, a bell-mouthed pipe inclosing the upper end of the exhaust-pipe and opening into the atmosphere, a branch pipe connecting the casing with the disinfecting-chamber at a point above the upper edge of the exhaust-pipe exteriorly of the bell-mouthed pipe, a branch pipe for connection with a chimney, and a valve interposed between the latter pipe and the connection with the disinfecting-chamber, substantially as and for the purposes specified.

14. The combination, substantially as described, with the disinfecting-chamber, valved air-ducts communicating with said chamber, a steam-generator, an exhaust-pipe, connections between the steam-space of the generator, the exhaust-pipe, and the disinfecting-chamber, of a valve-casing on the exhaust-pipe, into which said pipe projects, a connection between the casing and the disinfecting-chamber, a bell-mouthed pipe inclosing the upper end of the exhaust-pipe and opening into the atmosphere, a branch for connecting the casing with a chimney, a valve arranged in the casing between the latter branch and the connection with the disinfecting-chamber, a rock-shaft, levers secured thereto, and connecting-rods connecting the levers with the valve in the valve-casing and the valves in the air-ducts, whereby all of said valves may be set at a single operation of the rock-shaft, substantially as and for the purposes specified.

In testimony whereof I affix my signature in presence of two witnesses.

EUGEN CLARENBACH.

Witnesses:
A. DEMCLINS,
B. ROI.